United States Patent
Kawai

[15] 3,641,490
[45] Feb. 8, 1972

[54] DEVICE FOR INDICATING DISCONNECTION OF TURN SIGNAL LAMP IN A TURN-SIGNALLING SYSTEM FOR AUTOMOTIVE VEHICLE

[72] Inventor: Hisashi Kawai, Toyohashi-shi, Japan

[73] Assignee: Nippon Denso Company Limited, Kariya-shi, Japan

[22] Filed: June 10, 1969

[21] Appl. No.: 831,845

[30] Foreign Application Priority Data

June 14, 1968 Japan.................................43/41062
July 16, 1968 Japan.................................43/50091

[52] U.S. Cl..................................340/55, 340/82, 340/251
[51] Int. Cl..........................G08b 21/00, B60q 1/38
[58] Field of Search.............340/55, 79, 80, 82, 331, 331 X, 340/251; 180/103

[56] References Cited

UNITED STATES PATENTS

| | | | |
|---|---|---|---|
| 3,422,421 | 1/1969 | Moller et al. | 340/331 |
| 3,454,941 | 7/1969 | Voorman, Jr. | 340/251 |
| 3,500,315 | 3/1970 | Shimada | 340/82 |

Primary Examiner—John W. Caldwell
Assistant Examiner—Glen R. Swann, III
Attorney—Cushman, Darby & Cushman

[57] ABSTRACT

A device for indicating disconnection of turn signal lamps having a power source, a turn signal generator, a plurality of current-interrupting elements controlled by said turn signal generator, a plurality of turn signal lamps connected to said power source through the respective current-interrupting elements, a plurality of series circuits of a resistor and a diode or of two resistors whose junction is respectively connected to the junction of each set of said current-interrupting element and said turn signal lamp, a transistor whose base is connected through a resistor or directly to said series circuits so that it constitutes an OR circuit together with said series circuits and said resistor if used, said OR circuits being connected to said power source in such a manner that it is placed in operation in response to the closure of a key switch, and a turn signal indicator connected to said power source through the collector and emitter of said transistor in said OR circuit.

15 Claims, 4 Drawing Figures

INVENTOR
Hisashi Kawai

DEVICE FOR INDICATING DISCONNECTION OF TURN SIGNAL LAMP IN A TURN-SIGNALLING SYSTEM FOR AUTOMOTIVE VEHICLE

BACKGROUND OF THE INVENTION

1. Field of the Invention

This invention relates to a disconnection or discontinuity indicating device for informing the driver of a failure of lighting of any one of a number of turn signal lamps in the turn-signalling system for an automotive vehicle due to disconnection trouble.

2. Description of the Prior Art

Operation of conventional disconnection-indicating devices used in turn-signalling systems for automotive vehicles is such that, when disconnection occurs in one of a plurality of turn signal lamps, a reduction in the load current due to disconnection of the turn signal lamp is detected to greatly vary the flickering interval of a turn signal indication lamp disposed in the compartment or stop the flickering operation of the turn signal indication lamp thereby to indicate the disconnection of the turn signal lamp. However, the conventional disconnection-indicating device which is adapted to indicate disconnection of a turn signal lamp by detecting a variation in the load current has an inherent fault that the turn signal indication lamp does not inform the driver of the disconnection of the turn signal lamp until a turn signal switch is depressed for starting the operation of a turn signal generator.

Thus, the driver cannot be informed of disconnection of a turn signal lamp prior to placement of the turn-signalling system in operation. In case the driver finds disconnection of the turn signal lamp after he has depressed the turn signal switch during driving, he cannot inform other automotive vehicles as to the turning direction in spite of the fact that the automotive vehicle is going to turn in a particular direction. This is quite a serious problem.

Recently, a turn-signalling system of the so-called successive lighting type is finding its application to automotive vehicles. The turn-signalling system of the successive lighting type includes a plurality of, say, three left-hand and three right-hand turn signal lamps disposed at the rear part of an automotive vehicle, and the three turn signal lamps on either side are successively energized in the order of from the innermost one to the outermost one so as to clearly indicate the turning direction of the vehicle. The conventional turn-signalling system of the successive lighting type described above is so arranged that the operation of a turn signal generator is stopped in response to disconnection of a turn signal lamp thereby to cease the flickering operation of a turn signal indication lamp. This turn-signalling system is also defective in that the driver cannot be informed of the disconnection of a turn signal lamp prior to placement of the turn-signalling system in operation. In addition, since the turn signal indication lamp ceases its operation as a result of disconnection of the turn signal lamp, the remaining sound (good) turn signal lamps cease their flickering operation too, which leads to a problem that the vehicle does not exhibit any turning direction indication to other automotive vehicles running in front of or behind it. A problem similar to the above is also seen in a conventional turn-signalling system of the kind having a function of the so-called specific load type in which a turn signal generator is capable of detecting disconnection of any one of the turn signal lamps and is adapted to make normal operation under a load of a specific magnitude.

SUMMARY OF THE INVENTION

In an attempt to overcome the above problems, it is an object of the present invention to provide, in specific embodiments a device for indicating disconnection of or discontinuity in turn signal lamps comprising a power source, a turn signal generator, a plurality of current-interrupting elements controlled by said turn signal generator, a plurality of turn signal lamps connected to said power source through the respective current-interrupting elements, a plurality of series circuits of a resistor and a diode or of two resistors whose junction is respectively connected to the junction of each set of said current-interrupting element and said turn signal lamp, a transistor whose base is connected through a resistor or directly to said series circuits so that it constitutes an OR circuit together with said series circuits and said resistor or together with said series circuits, said OR circuit being connected to said power source in such a manner that it is placed in operation in response to closure of a key switch, and a turn signal indicator connected to said power source through the collector and emitter of said transistor in said OR circuit. When all the turn signal lamps are normal, the turn signal indicator which may be a lamp or buzzer is energized in accordance with the waveform of an output from a flicker signal generator. In the case of a turn-signalling system of the successive lighting type, the resistance of the two resistors forming each pair may suitably be determined so that the intensity of light emitted from the turn signal indicator or the magnitude of sound emitted from the turn signal indicator is successively varied as a plurality of, say, three turn signal lamps are successively energized so as to inform the driver of the fact that the turn signal lamps are being successively energized. The turn signal indicator is placed in its nonoperative state when the flicker signal generator is not in operation. Further, when any one of the turn signal lamps is disconnected, the turn signal indicator is placed in operation as soon as the key switch of the vehicle is depressed thereby to indicate the presence of disconnection in one of the turn signal lamps before the vehicle is started. On the other hand, the remaining good turn signal lamps operate properly to give the turning direction indication.

DESCRIPTION OF THE PREFERRED EMBODIMENTS

Figure 1:
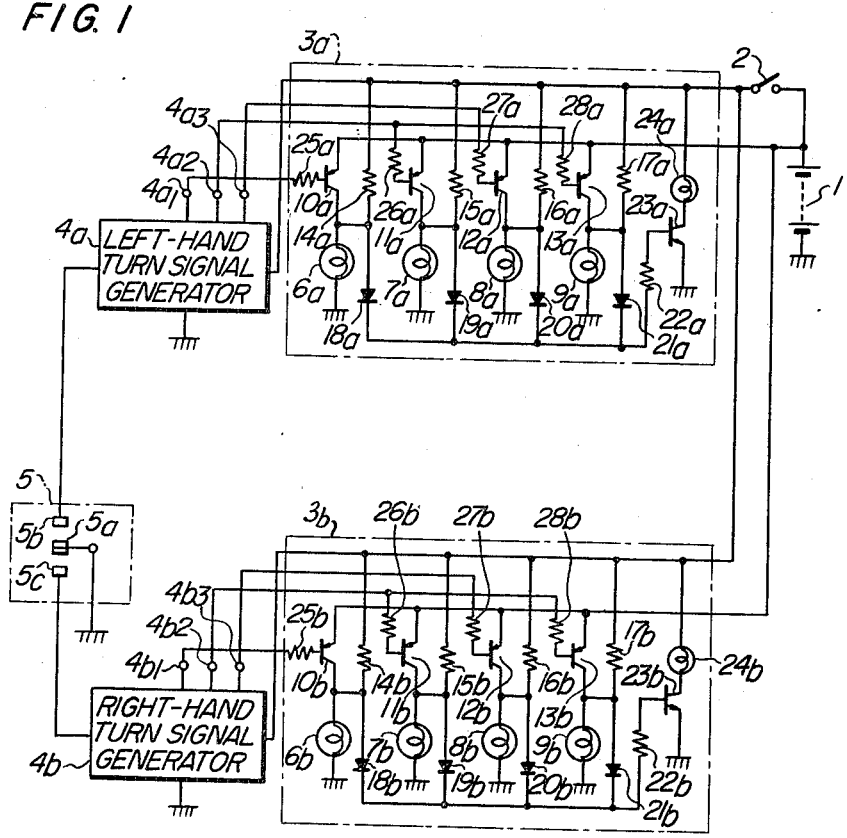
FIG. 1 is an electrical connection diagram showing an embodiment of the device according to the present invention.
Figure 3:
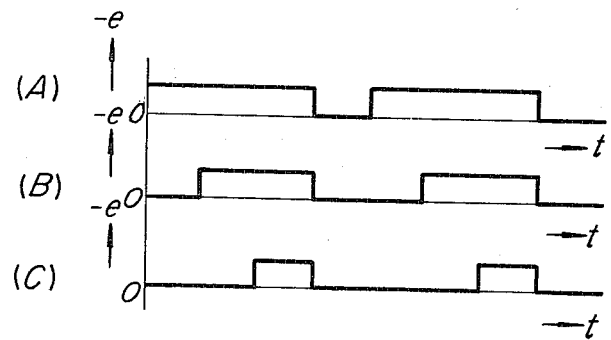
FIG. 3 is a graphic representation of waveforms of a voltage output from the left-hand and right-hand turn signal generators of a successive lighting type shown in FIG. 1 or 2.

FIG. 1 is an electrical connection diagram of the device embodying the present invention when it is applied to a turn-signalling system of a successive lighting type. Referring to FIG. 1, a key switch 2 has its stationary terminal connected to the positive electrode of a DC power source 1 in an automotive vehicle. A left-hand lamp driving circuit 3a includes four lamp current interrupting circuits. Similarly, a right-hand lamp-driving circuit 3b includes four lamp current interrupting circuits. A left-hand turn signal generator 4a of a successive lighting type is provided with three output terminals $4a_1$, $4a_2$ and $4a_3$ for delivering respective output voltages of waveforms as shown at A, B and C of FIG. 3. For example, the turn signal generator may be such that a flip-flop circuit is driven by the output from an astable multivibrator and the output from the flip-flop circuit and the output from the astable multivibrator are supplied to a logic circuit for deriving an output of waveforms as shown in FIG. 3. In FIG. 3, the vertical axis represents voltage $e$ and the horizontal axis represents time $t$. Similarly, a right-hand turn signal generator 4b of a successive lighting type is provided with three output terminals $4b_1$, $4b_2$ and $4b_3$ for delivering respective output voltages of waveforms as shown at A, B and C of FIG. 3, and has a structure similar to that of the left-hand turn signal generator 4a of the successive lighting type described above. In lieu of the above arrangement, a single turn signal generator of a successive lighting type may be provided and operated in such a way that its signal output is switched over between the left-hand lamps and right-hand lamps. A turn signal switch 5 is provided to actuate the turn signal generators 4a and 4b. The turn signal switch 5 includes a movable contact 5a, a stationary contact 5b for left-turn signalling and a stationary contact 5c for right-turn signalling.

Turn signal lamps 6a, 7a and 8a are disposed on the left-hand side at the rear part of the automotive vehicle, with the turn signal lamp 6a mounted at a position nearest to the center of the vehicle, the turn signal lamp 7a mounted at a position intermediate between the other two lamps and the turn signal lamp 8a mounted at a position remotest from the center of the vehicle. A turn signal lamp 9a is disposed on the left-hand side at the front part or front nearside of the vehicle. Transistors 10a, 11a, 12a and 13a are controlled by the output signal delivered from the left-hand turn signal generator 4a of successive lighting type. The turn signal lamps 6a, 7a, 8a and 9a are connected to the power source 1 through the collector and emitter of the respective transistors 10a, 11a, 12a and 13a. The intermediate turn signal lamp 7a of the three turn signal lamps 6a, 7a and 8a disposed on the left-hand side at the rear part of the vehicle flickers at a flicker ratio which is substantially equal to 1:1. In order that the turn signal lamp 9a disposed on the left-hand side at the front part of the vehicle can flicker in synchronism with the intermediate turn signal lamp 7a, the base of the transistor 13a for interrupting current supply to the turn signal lamp 9a and the base of the transistor 11a for interrupting current supply to the turn signal lamp 7a are connected to the same output terminal $4a_2$ of the left-hand turn signal generator 4a of successive lighting type. The emitters of the transistors 10a, 11a, 12a and 13a are directly connected to the power source 1 without interposing therebetween the key switch 2 so that the turn signal lamps, when used to serve also as stoplights, can be energized to act as the stoplights in a state in which the key switch 2 is in its open position. Resistors 14a, 15a, 16a and 17a are connected in series with respective diodes 18a, 19a, 20a, and 21a. The junctions between the resistors 14a, 15a, 16a and 17a and the diodes 18a, 19a, 20a and 21a are connected to the respective junctions between the transistors 10a, 11a, 12a and 13a and the turn signal lamps 6a, 7a, 8a and 9a. The series circuits of the resistors 14a, 15a, 16a and 17a and the diodes 18a, 19a, 20a and 21a are connected to the base of a transistor 23a through a resistor 22a. The transistor 23a constitutes an OR circuit together with the resistors 14a, 15a, 16a and 17a, the diodes 18a, 19a, 20a and 21a and the resistor 22a. A left-hand turn signal indication lamp 24a is connected across the power source 1 through the collector and emitter of the transistor 23a and the key switch 2. In this connection, it will be understood that an alarm such as a buzzer may be used in lieu of the turn signal indication lamp 24a. Resistors 25a, 26a, 27a and 28a are base resistors of the respective transistors 10a, 11a, 12a and 13a.

While the structure of the left-hand lamp-driving circuit 3a has been described in the above, it will be understood that the right-hand lamp-driving circuit 3b has a structure entirely similar to the above and any detailed description as to such a structure will be unnecessary. The difference therebetween is that turn signal lamps 6b, 7b and 8b are disposed on the right-hand side at the rear part of the vehicle and a turn signal lamp 9b is disposed on the right-hand side at the front part of the vehicle. The turn signal lamp 6b of the three turn signal lamps 6b, 7b and 8b disposed on the right-hand side at the rear part of the vehicle is mounted at a position nearest to the center of the vehicle, and the turn signal lamp 7b is mounted at a position intermediate between the other two lamps, while the turn signal lamp 8b is mounted at a position remotest from the center of the vehicle.

Figure 2:
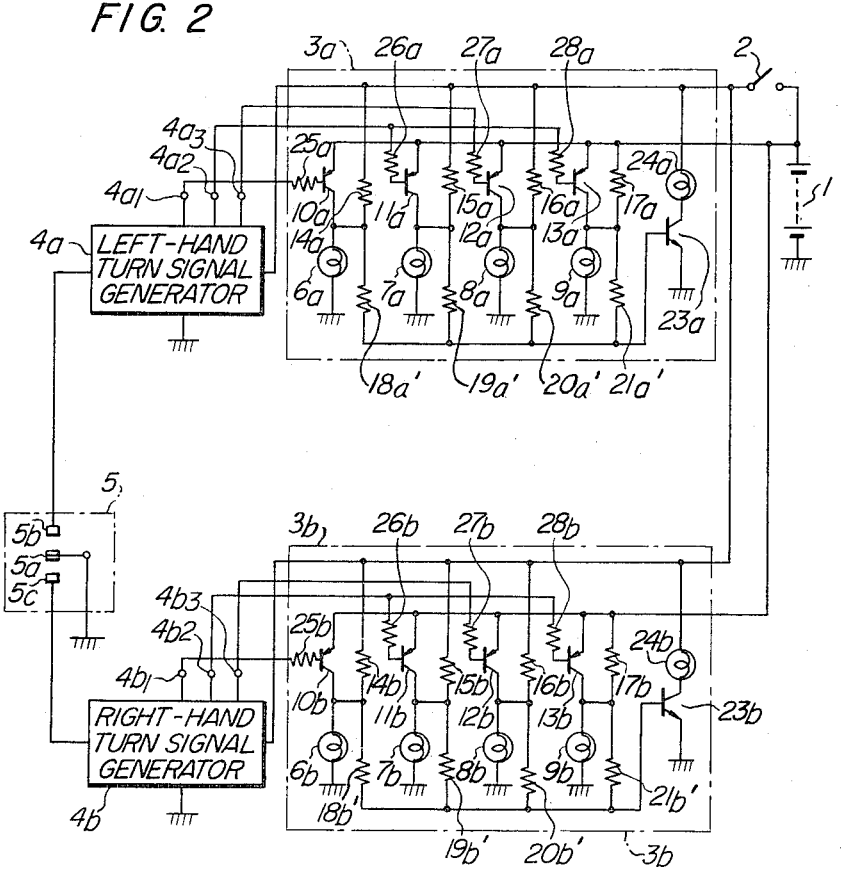
FIG. 2 is an electrical connection diagram showing another embodiment of the device according to the present invention.

Another embodiment of the present invention shown in FIG. 2 is the same in structure as that of the preceding embodiment shown in FIG. 1 except that the diodes 18a, 19a, 20a, 21a, 18b, 19b, 20b and 21b in FIG. 1 are replaced by respective resistors 18a', 19a', 20a', 21a', 18b', 19b', 20b' and 21b' and the resistors 22a and 22b in FIG. 1 are eliminated. Therefore, any detailed description as to the structure of the second embodiment will not be given herein.

In operation, the key switch 2 is urged to its closed position to start the engine. When the left-hand turn signal lamps 6a, 7a, 8a, and 9a and the right-hand turn signal lamps 6b, 7b, 8b and 9b are free from disconnection trouble, current is supplied from the power source 1 to the left-hand lamp-driving circuit 3a and the right-hand lamp-driving circuit 3b through the key switch 2. In the left-hand lamp-driving circuit 3a, current is supplied to the circuit of the resistor 14a and the turn signal lamp 6a, the circuit of the resistor 15a and the turn signal lamp 7a, the circuit of the resistor 16a and the turn signal lamp 8a, and the circuit of the resistor 17a and the turn signal lamp 9a, while in the right-hand lamp-driving circuit 3b, current is supplied to the circuit of the resistor 14b and the turn signal lamp 6b, the circuit of the resistor 15b and the turn signal lamp 7b, the circuit of the resistor 16b and the turn signal lamp 8b, and the circuit of the resistor 17b and the turn signal lamp 9b. Since the resistance value of the resistors 14a, 15a, 16a, 17a, 14b, 15b, 16b and 17b is very high compared with that of the turn signal lamps 6a, 7a, 8a, 9a, 6b, 7b, 8b and 9b, a potential substantially equal to ground potential appears at each of the junctions between the resistors 149, 15a, 16a, 17a, 14b, 15b, 16b and 17b and the respective turn signal lamps 6a, 7a, 8a, 9a, 6b, 7b, 8b, and 9b. In other words, the collector potential of each of the transistors 10a, 11a, 12a, 13a, 10b, 11b, 12b and 13b is substantially equal to ground potential. Thus, the transistors 23a and 23b in the OR circuit are in their cutoff state and the left-hand turn signal indicator lamp 24a and the right-hand turn signal indicator lamp 24b are kept in their deenergized state.

In case, however, any one of the turn signal lamps 6a, 7a, 8a, 9a, 6b, 7b, 8b and 9b, for example, the left-hand turn signal lamp 7a develops disconnection trouble, the collector potential of the transistor 11a becomes substantially equal to the power source voltage with the result that base current is supplied to the transistor 23a through the diode 19a and the resistor 22a (FIG. 1) or through the resistor 19a' (FIG. 2) constituting the OR circuit with the transistor 23a. Accordingly, the transistor 23a is driven to its conducting state and the left-hand turn signal indicating lamp 24a is energized. Thus, as soon as the driver actuates the key switch 2, or in other words, before the turn-signalling system is placed in operation, he can know the fact that one of the left-hand turn signal lamps 6a, 7a, 8a and 9a is disconnected. Similarly, in the case of the right-hand turn signal lamps 6b, 7b, 8b and 9b, energization of the right-hand turn signal indicator 23b tells the driver the fact that one of the right-hand turn signal lamps is faulty.

Figure 4:
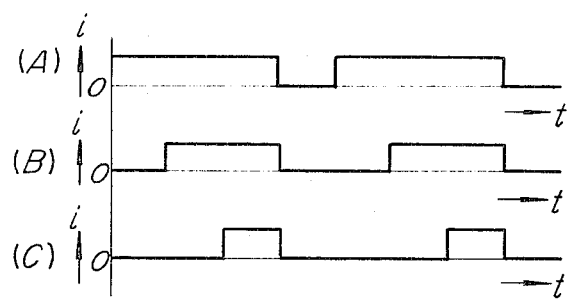
FIG. 4 is a graphic representation of waveforms of currents flowing through the three turn signal lamps shown in FIG. 1 or 2 disposed at the rear part of an automotive vehicle.

When the movable contact 5a of the turn signal switch 5 is brought into contact with the left turn signalling stationary contact 5b, the output signals having the voltage waveforms shown at A, B and C of FIG. 3 appear at the respective output terminals $4a_1$, $4a_2$ and $4a_3$ of the left-hand turn signal generator 4a of a successive lighting type to be supplied to the bases of the respective transistors 10a, 11a, 12a and 13a through the respective resistors 25a, 26a, 27a and 28a. Thus, the rear left-hand turn signal lamp 6a nearest to the center of the vehicle, the rear left-hand turn signal lamp 7a intermediate between the two lamps 6a and 8a, the rear left-hand turn signal lamp 8a remotest from the center of the vehicle, and the front left-hand turn signal lamp 9a flicker according to the current waveforms shown at A, B, C and B of FIG. 4, respectively. In FIG. 4, the vertical axis represents current $i$ and the horizontal axis represents time $t$. In this case, a waveform which is the logical sum of the waveforms shown at A, B and C of FIG. 4 is supplied to the base of the transistor 23a so that the left-hand turn signal indicator 24a flickers with the waveform representing the logical sum of the waveforms shown at A, B and C of FIG. 4, that is, the waveform shown at A of FIG. 4.

In the second embodiment shown in FIG. 2, the resistance value of the resistors 14a, 15a, 16a, 17a and of the resistors 18a', 19a', 20a' and 21a' may suitably be selected so that the composite resistance value in the base circuit of the transistor 23a varies depending on energization of the turn signal lamp 6a alone or simultaneous energization of the turn signal lamps 6a and 7a or simultaneous energization of the turn signal lamps 6a, 7a and 8a, and the current supplied to the base of the transistor 23a increases successively in the above order. Thus, the intensity of light emitted from the turn signal indication lamp 24a in response to simultaneous energization of the turn signal lamps 6a and 7a is stronger than the intensity of light emitted from the turn signal indication lamp 24a in response to energization of the turn signal lamp 6a alone. Likewise, the intensity of light emitted from the turn signal indication lamp 24a in response to simultaneous energization of the turn signal lamps 6a, 7a and 8a is stronger than the intensity of light emitted from the turn signal indication lamp 24a in response to simultaneous energization of the turn signal lamps 6a and 7a. From the above manner of operation of the turn signal indication lamp 24a, the driver can know that the three turn signal lamps 6a, 7a and 8a are successively energized.

It will be noted that the detection of disconnection of any one of the left-hand turn signal lamps 6a, 7a, 8a and 9a is effected by the operation of the OR circuit which is independent of the left-hand turn signal generator 4a of successive lighting type. In view of the above feature, the turn signal generator 4a of successive lighting type may have the function of the so-called variable load type which is adapted to make a predetermined interrupting operation without being affected by the load current so that the remaining good turn signal lamps can continue their flickering operation. This is very convenient for a case in which one of the turn signal lamps develops disconnection trouble during its turn-signalling operation or a case in which the driver wishes to start the vehicle although he knows previously that one of the turn signal lamps is faulty. In such a case, the remaining good turn signal lamps can be operated for the turn signalling. The left-hand turn signal indication lamp 24a is continuously energized because the transistor 23a is kept in its conducting state when disconnection trouble occurs in any one of the left-hand turn signal lamps 6a, 7a, 8a and 9a. Therefore, disconnection of any one of the left-hand turn signal lamps occurring during the turn-signalling operation can be identified by the driver from the continuous energization of the left-hand turn signal indication lamp 24a. Similarly, when the movable contact 5a of the turn signal switch 5 is brought into contact with the right turn signalling stationary contact 5c, the right-hand turn signal indication lamp 24b makes flickering operation as in the case of the left-turn signalling provided that all of the right-hand turn signal lamps 6b, 7b, 8b and 9b are normal or free from disconnection trouble. On the other hand, in case disconnection trouble occurs in any one of the right-hand turn signal lamps 6b, 7b, 8b and 9b, the right-hand turn signal indication lamp 24b is continuously energized to tell the driver that one of the right-hand turn signal lamps is faulty.

When the turn signal lamps are adapted to serve also as stoplights, the left-hand and right-hand lamp-driving circuits 3a and 3b may be combined with the brake system of the vehicle so that all the turn signal lamps at the rear part of the vehicle can simultaneously be energized in response to closure of the brake switch interlocked with the brake pedal. By this arrangement, the turn signal lamps are energized when the brake is applied to the vehicle to indicate that the vehicle is being braked, and at the same time, the turn signal indication lamps are continuously energized to tell the driver the fact that the turn signal lamps are energized as stoplights.

When the turn signal switch 5 is actuated to its left-turn signalling side in the state in which the brake switch is held in its closed position, the left-hand turn signal indication lamp 24a flickers to tell the driver the fact that the left-hand turn signal lamps 6a, 7a, 8a and 9a are flickering, while the right-hand turn signal indication lamp 24b is continuously energized to tell the driver the fact that the rear right-hand turn signal lamps 6b, 7b and 8b are energized as stoplights. In this connection, it will be noted that at least one of the turn signal lamps is disconnected in case the turn signal indication lamp is still energized although the driver's foot is removed from the brake pedal to restore the brake switch to its open position.

As described previously, the device according to the present invention is featured by the fact that detection of disconnection of any one of the turn signal lamps is effected by the operation of the OR circuit which is independent of the left-hand and right-hand turn signal generators 4a and 4b. Therefore, the turn signal generators 4a and 4b of the kind having the function of the so-called variable-load type can be employed. The device according to the present invention having such turn signal generators can easily be applied to a trouble display apparatus in which all of the left-hand and right-hand turn signal lamps at the front and rear parts of a vehicle can simultaneously be energized and in which the requirement is such that the last one of the turn signal lamps must normally be flickered even if the turn signal lamps are successively damaged to leave solely one lamp. This is accomplished by adding to the turn-signalling system a switch which actuates both the left-hand and right-hand turn signal generators 4a and 4b simultaneously.

In the embodiments described above, the transistors 10a, 11a, 12a, 13a, 10b, 11b, 12b and 13b are used as the current-interrupting elements for interrupting current supply to the turn signal lamps. However, it will be understood that relay contacts may be employed in lieu of the transistors.

From the foregoing description it will be understood that the present invention provides a device for indicating disconnection of turn signal lamps comprising a power source, a turn signal generator, a plurality of current-interrupting elements controlled by said turn signal generator, a plurality of turn signal lamps connected to said power source through the respective current-interrupting elements, a plurality of series circuits of a resistor and a diode or of two resistors whose junction is respectively connected to the junction of each set of said current-interrupting elements and said turn signal lamp, a transistor whose base is connected through a resistor or directly to said series circuits so that it constitutes an OR circuit together with said series circuits and said resistor or together with said series circuits, said OR circuit being connected to said power source in such a manner that it is placed in operation in response to closure of a key switch, and a turn signal indicator connected to said power source through the collector and emitter of said transistor in said OR circuit. By virtue of the above arrangement, the turn signal indicator is energized to indicate occurrence of disconnection trouble in any one of the turn signal lamps as soon as the driver actuates the key switch. Thus, the driver can always confirm whether or not disconnection trouble occurs in the turn signal lamps before the vehicle is started. This obviates completely the prior danger that the driver cannot find disconnection trouble in the turn signal lamps until he actuates the turn signal switch during running of the vehicle. Thus, the present invention offers an improvement in vehicle safety. Further, during the turn-signalling operation, the turn signal indicator is discontinuously operated according to the waveform which is the logical sum of currents flowing through the turn signal lamps so as to thereby tell the driver that the turn signal lamps are normally functioning. In the case of the turn-signalling system of a successive lighting type shown in FIG. 2, the resistance values of two different kinds of resistors may suitably be selected so that the intensity of light or magnitude of sound emitted from the turn signal indicator may progressively be varied as the three turn signal lamps are successively energized so as to inform the driver that the turn signal lamps are successively energized in a predetermined order.

Even if any one of the turn signal lamps is disconnected during the turn-signalling operation, the turn signal indicator is continuously energized by the output from the OR circuit so as to immediately tell the driver the fact that one of the turn signal lamps is disconnected. Further, the turn signal indicator having the function of the variable-load type can be used to display disconnection trouble occurring in the turn signal lamps since the detection of disconnection of the turn signal lamps is effected by the operation of the OR circuit which is independent of the turn signal generator. Thus, even when one of the turn signal lamps develops disconnection trouble during the turn-signalling operation, the normal turn-signalling operation can be continued by the remaining sound turn signal lamps. Furthermore, the turn-signalling system employing the device according to the present invention can very simply be utilized as a trouble display apparatus by virtue of the fact that the present invention can employ a turn signal generator having the function of the variable-load type as described above. In accordance with the present invention, a turn-signalling system of a successive lighting type which includes quite many turn signal lamps can be constructed at low cost since the number of the resistors and the diodes or of the sets of the resistors may merely be increased to deal with an increase in the number of the turn signal lamps.

I claim:

1. A control device operable from a power source via a power source switch for operating and indicating operation or circuit discontinuity in any of a plurality of vehicle signal lamps and in their respective lamp circuits, comprising:
a turn signal generator;
a plurality of current-interrupting elements controlled by said turn signal generator;
means for connecting said current-interrupting elements to said power source and respectively to said lamp circuits to effect respective junctions between said elements and circuits to cause blinking of said lamps when said generator is on;
an OR circuit including a plurality of input circuits respectively connected to said current-interrupting elements at the said respective junction thereof with said signal lamp circuits;
means for connecting said OR circuit to said power source in such a manner that it is placed in operation in response to closure of said power source switch; and
a signal indicator connected to said OR circuit for indicating any circuit discontinuity as to any of said lamps when said generator is both off and on and for indicating blinking operation of at least certain of said lamps when said generator is on.

2. A device as in claim 1 wherein:
each of said OR input circuits includes a respective first impedance in the form of a resistor and serially connected thereto a respective second impedance; and
said OR circuit includes an output transistor having a collector-emitter circuit connected to said signal indicator and a base;
said second impedances being commonly coupled to said base.

3. A device as in claim 2 wherein said second impedances include respective diodes which are commonly coupled to said transistor base by a base resistor.

4. A device as in claim 2 wherein each of said second impedances is a resistor directly connected to said transistor base.

5. A device as in claim 2 wherein said second impedances have different resistance values.

6. A device in claim 2 in combination with said lamp circuits having said lamps therein, said circuits being connected as aforeindicated respectively to said current-interrupting elements to form a plurality of series combinations thereof, and with said power source connected directly across each of said series combinations and with said power source switch being a key switch connected between said power source and OR circuit.

7. A device as in claim 6 in combination with a second device as in that claim and a manually operable turn signal switch connected to the said turn signal generators of both devices for turning either generator on exclusively or both off together.

8. A control device for operating from a power source and indicating circuit discontinuity in any of a plurality of vehicle signaling lamps and in their respective lamp circuits, comprising:
control means regulatable to on and off conditions and adapted to be connected to said power source and lamp circuits for causing said lamps to flicker when the control means is turned to its on condition; and
means, including an OR circuit having a plurality of input circuits respectively connectable to said lamp circuits and having an output-signaling indicator, for sensing and indicating via said indicator any discontinuity in any of said lamp circuits when said control means is in either of its said off and on conditions.

9. A device as in claim 8 wherein said input circuits are resistive and have different resistance values.

10. A device as in claim 8 for use in a vehicle wherein:
said control means includes a turn signal generator and a group of lamp control switches respectively serially connectable to a corresponding number of said lamps, each said control switch being controlled by said generator to cause said lamps to flicker;
means for connecting said control switches in parallel and directly to said vehicle power source; and
means for connecting said OR input circuits in parallel to said vehicle power source through said power source switch whereby said indicator indicates lamp discontinuity in said group of lamps when said power source switch is closed whether or not said turn signal generator is on or off.

11. A control device as in claim 8 wherein said OR circuit includes switch means having an input commonly connected to said input circuits for keeping said indicator on continuously only when a said discontinuity is sensed by said OR circuit regardless of whether said control means is then in an off or on condition and for otherwise turning said indicator on and off while said control means is in an on condition.

12. A device as in claim 11 wherein said switch means includes a transistor having a base resistor and each of said OR input circuits includes a respective diode connected to said resistor.

13. A device as in claim 11 for use with a successive lighting type vehicle turn-signaling system, wherein:
said control means includes means for causing a series of said lamps to light successively with each earlier lighted lamp normally remaining on until each later lighted lamp in said series of lamps is lighted, said device further comprising:
means including differently proportioned resistance means respectively in the said OR input circuits for providing from said indicator an indication of operation and discontinuity of each of said lamps in said series thereof; and
means connecting said control means and OR circuit for causing each workable lamp in said series to operate when said control means is in its said on condition notwithstanding a discontinuity in one of the lamps in said series;
the signaling by said indicator being of different intensities for different combinations of workable lamps in said series due to said differently proportioned resistance means.

14. A device as in claim 11 wherein said switch means includes a transistor having a base and each of said OR input circuits includes respective resistor means connected to the base of said transistor.

15. A device as in claim 14 wherein different ones of said resistor means have different resistance values for causing said indicator to operate at different signaling intensities.

* * * * *